US005882102A

United States Patent [19]
Pileski

[11] Patent Number: 5,882,102
[45] Date of Patent: Mar. 16, 1999

[54] FIBER OPTIC LIGHT TURRET WITH BUILT-IN ILLUMINATION CONTROL

[75] Inventor: Michael J. Pileski, Skaneateles, N.Y.

[73] Assignee: Welch Allyn, Inc., Skaneateles Falls, N.Y.

[21] Appl. No.: 781,640

[22] Filed: Jan. 10, 1997

[51] Int. Cl.[6] .................................................. F21V 11/08
[52] U.S. Cl. ........................... 362/32; 362/280; 362/282; 362/323; 359/234; 385/89
[58] Field of Search ..................... 359/233, 234, 359/235; 385/25, 117, 901, 88, 89, 90; 362/32, 280–284, 321–324

[56] References Cited

U.S. PATENT DOCUMENTS

| 3,775,606 | 11/1973 | Bazell et al. | 362/32 |
|---|---|---|---|
| 3,831,017 | 8/1974 | Auer | 362/32 |
| 3,975,099 | 8/1976 | Taylor | 359/234 |
| 4,233,650 | 11/1980 | Hagner et al. | 362/32 |
| 4,425,599 | 1/1984 | Rieder et al. | 362/32 |
| 4,773,723 | 9/1988 | Cuda | 385/89 |
| 4,786,127 | 11/1988 | Molnar | 385/52 |
| 5,006,965 | 4/1991 | Jones | 362/32 |
| 5,144,201 | 9/1992 | Graham et al. | 313/634 |
| 5,283,718 | 2/1994 | Stephenson et al. | 362/32 |
| 5,295,052 | 3/1994 | Chin et al. | 362/32 |
| 5,594,826 | 1/1997 | Wood et al. | 385/88 |

Primary Examiner—Alan Cariaso
Attorney, Agent, or Firm—Wall Marjama & Bilinski

[57] ABSTRACT

A turret assembly is provided for use with a light box for supporting and indexing a plurality of fiber optic bundles relative to a light source contained within the light box. The turret assembly includes a supporting element having a plurality of openings for retaining a plurality of fiber bundles which is rotatably attached to a hub member mounting the turret assembly to the light box. The turret assembly also includes a light intensity control member for adjusting the intensity of light entering each indexed fiber optic bundle from said light source. The intensity control member is fixedly attached to an adjustment knob which independently rotates a light vane positioned in the light path extending from the light source in order to selectively to vary the illumination output therefrom.

24 Claims, 2 Drawing Sheets

FIBER OPTIC LIGHT TURRET WITH BUILT-IN ILLUMINATION CONTROL

FIELD OF THE INVENTION

This invention relates generally to light boxes, and specifically to a light turret capable of supporting a plurality of fiber optic ports in relation to the light box, the turret including a built-in illumination control.

BACKGROUND OF THE INVENTION

Fiber optics have long been used in medical examination devices such as otoscopes, endoscopes, and the like, due to the bright illumination that is provided over longer distances by internal reflection. Typically, a light box having a single illumination source is utilized to provide light to an examining device. A single fiber optic light bundle is used to transmit the illumination between the light box and the examining device of choice.

Fiber optic light bundles are used in variety of different medical applications and are manufactured in a wide range of sizes such as, for example, 1 to 12 mm. In addition to being made in different sizes, fiberoptic light bundles are also manufactured with a variety of different types of fiberoptic connectors or ports. There is a natural desire to create an adapter operatively connected to the light box which allows several fiber optic bundles to be interchangeably used in order to perform a number of applications.

U.S. Pat. No. 5,283,718 to Stephenson, et al describes a fiber optic turret assembly which is rotatably attached to the drawer face of the light box and selectively aligns a planar fiber optic interface with one of several sizes of fiber optic cables. Each fiber optic cable or port is therefore rotatably positioned into the light path of the light source within the light box. Similar concepts are described in U.S. Pat. Nos. 3,831,017 to Auer, 4,773,723 to Cuda and 4,786,127 to Molnar, each employing an external rotatable selector to move any of a plurality of fiber optic ports into and out of alignment with at least one light source retained internally within a light box.

It is sometimes desirable to adjust the intensity of light passing into the fiber optic ports. One way of adjusting the intensity is to provide a light box having a variable illumination control, either mechanically or through circuitry, which is contained within the light box. Such light boxes are usually more costly, however, and correspondingly increase the size and weight thereof.

It is a need therefore, to provide an adaptor for a light box which allows for different types and sizes of fiberoptic bundles to be conveniently switched therebetween, and includes an illumination control in the adapter which is easy to use and adjust during an examination procedure.

SUMMARY OF THE INVENTION

It is therefore a primary object of the present invention to improve light box adaptors.

It is an object of the present invention to provide an adaptor for a light box which interchangeably receives various fiber bundle ports of varying size.

It is another object of the present invention to facilitate ease of interchanging fiber bundle ports on a light box.

It is yet another object of the present invention to facilitate ease of controlling the desired illumination of a fiber bundle port from a contained illumination source.

It is a further object of the present invention to provide a rotatable turret having a built-in illumination control which is easy to adjust.

It is yet a further object of the present invention to provide a turret assembly having the capability of supporting a plurality of fiber optic ports, and of selectively varying the amount of illumination supplied thereto.

Therefore, and according to a preferred aspect of the present invention there is provided a turret assembly for supporting and indexing a plurality of fiber optic bundles relative to a source of illumination, said turret assembly comprising:

support means for supporting a plurality of fiber optic bundles;

means for rotatably adjusting said support means for moving at least one of said fiber optic ports into and out of a light path extending from said source of illumination; and adjustable intensity control means for variably controlling the intensity of light from said source of illumination entering said at least one supported fiber optic bundle.

Preferably, the support means allows a plurality of fiber optic connectors of varying sizes and geometries to be selectively attached to and detached from the turret assembly. Still further, the intensity control means is contained within the turret assembly and is conveniently controlled by adjustment means on the turret assembly. Preferably, the light intensity control operates independently from the rotatable turret, while being arranged in a relatively convenient and extremely compact manner.

In addition, the rotatable turret assembly includes indexing means to properly align a supported fiber optic bundle with the illumination source to allow a focused beam of light to be directed into a supported fiber optic bundle for transmission into a medical diagnostic instrument or other suitable location.

According to another preferred aspect of the present invention, there is provided a turret assembly for supporting and indexing a plurality of fiber optic bundles relative to a light source, comprising:

a supporting element having a plurality of openings for retaining a plurality of fiber bundles radially spaced about a central opening;

a hub member sized to fit within said central opening, said supporting element being mounted for rotation thereabout to cause at least one of said fiber optic bundles to be moved into and out of a light path from said light source; and a light intensity control member disposed between said light source and said supporting element for adjusting the intensity of light along said light path into said at least one fiber optic bundle.

Preferably, the light intensity control member is rotatable and includes at least one variably sized aperture which is oriented into and out of the light path by means of an adjustment knob located conveniently on the turret assembly. Preferably, the adjustment knob is operated independently from the rotatable supporting member.

According to yet another preferred aspect of the present invention, there is provided a light box comprising a housing and a source of illumination therein, said light box including an exterior turret assembly including a supporting member having a plurality of apertures for retaining a corresponding number of fiber optic connectors, at least two openings being of different sizes for accommodating different sized fiber optic bundles, means for rotatably moving at least one of said fiber optic bundles into and out of a light path from said source of illumination, and a light intensity control member positioned between said source of illumination and said supporting member for varying the output of illumination from said light source to said at least one fiber optic bundle.

An advantage of the present invention is that the turret includes an intensity control provided on the turret assembly and external to the light box for simple and selective control by the user. In this manner, the illumination can be controlled without having to provide a light box having extensive dedicated circuitry.

These and other objects, features, and advantages will now be described according to the following Detailed Description of the Invention in conjunction with the accompanying drawings.

DETAILED DESCRIPTION OF THE INVENTION

Figures 2, 3:
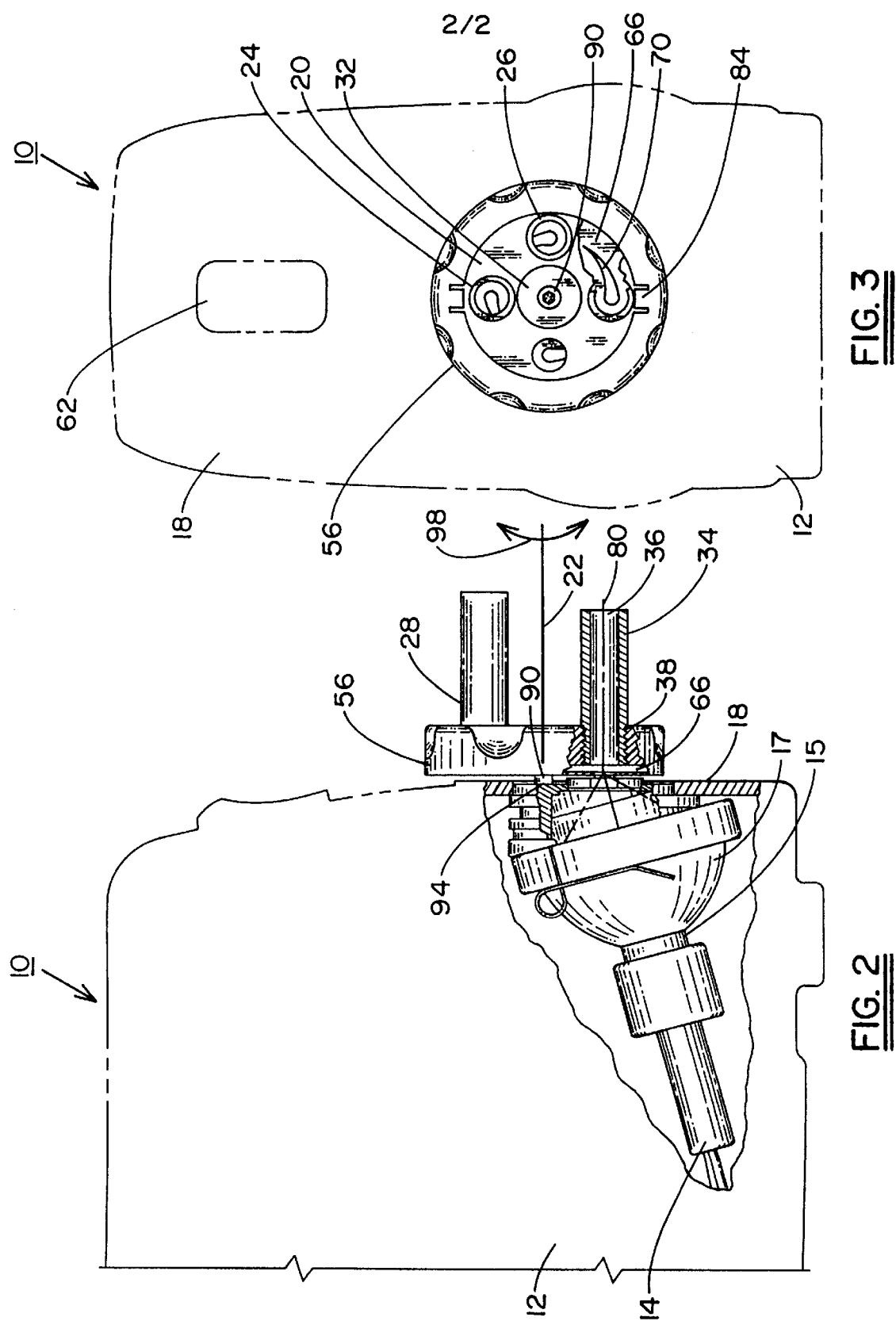
FIG. 2 is a side assembly view of the turret assembly of FIG. 1 as attached to a light box.
FIG. 3 is a front assembly view of the turret assembly of FIGS. 1 and 2.

The following description refers to a turret assembly in accordance with a preferred embodiment of the present invention. Referring first to FIG. 2, there is shown a light box 10 having a housing 12 retaining therein a light source assembly 14. The light source assembly 14 includes a lamp 15 which is retained within an elliptical reflector 17 in a manner commonly known to those of ordinary skill. According to this embodiment, the lamp 15 is a high intensity low wattage halide discharge lamp, such as described in commonly assigned U.S. Pat. No. 5,144,201 to Graham et al, the contents of which are hereby incorporated in their entirety by reference.

Figure 1:
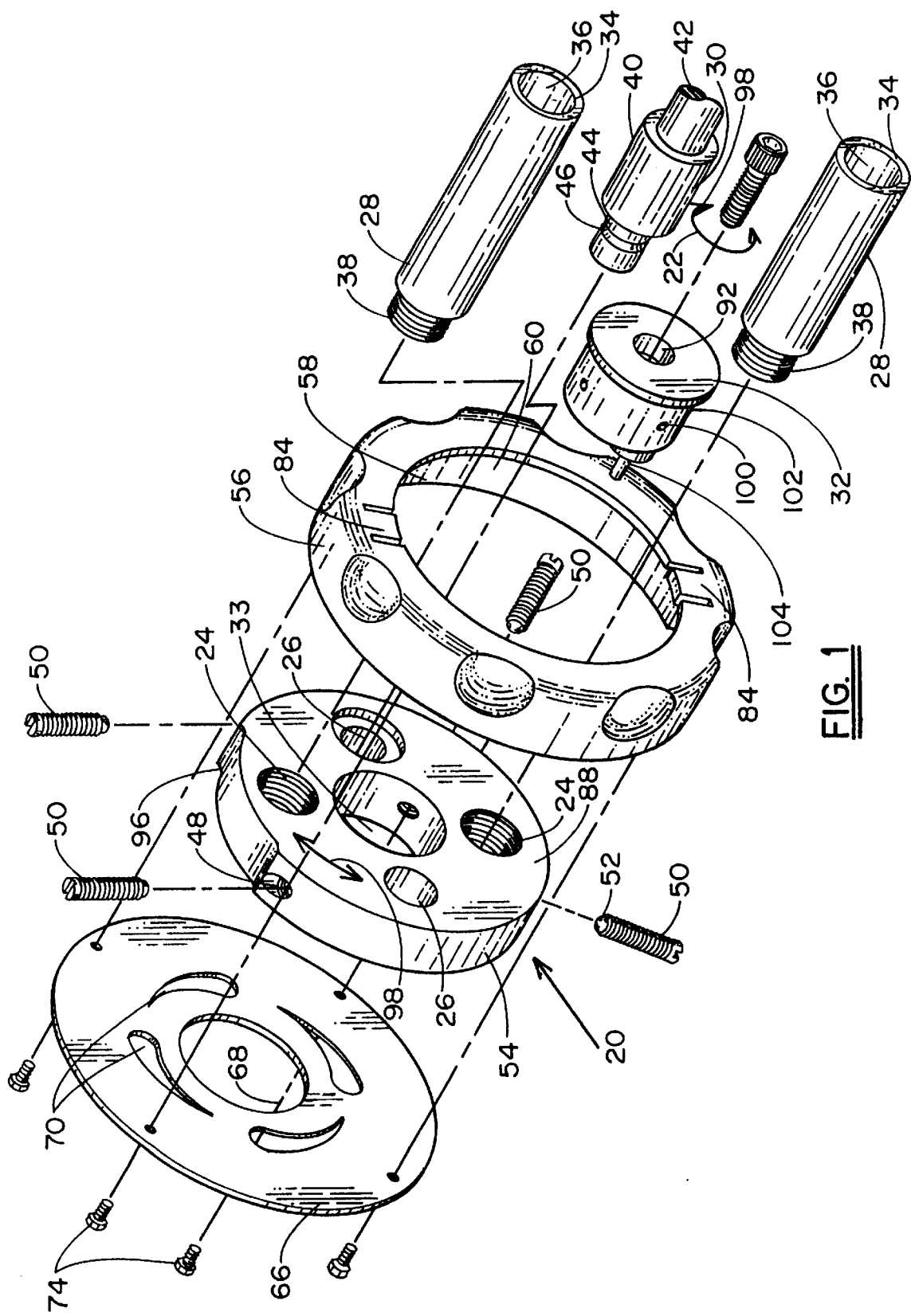
FIG. 1 is an exploded view of a turret control in accordance with a preferred embodiment of the present invention.

A rotatable turret assembly 16 is fixedly attached to a front wall 18 of the light box 10 in a manner described in greater detail below. Referring most particularly now to FIG. 1, the turret assembly 16 includes a supporting member 20, made from a non-conductive plastic or other suitable material and having a plurality of spaced mounting apertures 24, 26 for accommodating a plurality of fiber optic connectors 28 and 30. Preferably, the mounting apertures 24, 26 have an array of different diameters for accommodating various fiber optic connectors of differing sizes and/or types. According to this particular embodiment, the supporting member 20 includes four (4) equally spaced mounting apertures 24, 26 arranged circumferentially about a central opening 33, which is sized for retaining a cylindrically shaped hub member 32 to allow rotation of the supporting member 20 about a defined axis 22. The hub member 32 also fixedly attaches the turret assembly 16 to the light box 10, FIG. 2, as described below.

According to this embodiment, the diametrically opposed mounting aperture pair 24 are threaded. Each particular light bundle (not shown) is contained within a particular fiberoptic connector 28, 30. Referring to FIGS. 1 and 2, the fiber optic connectors 28 include an open-ended cylindrical housing 34 having a hollow interior 36 for retaining the fiber optic bundle (not shown) with a circular cross section and having a threaded engagement portion 38. Alternately, the fiber optic connectors 30 similarly include an open-ended housing 40 having a hollow interior 42. A front engagement portion 44 includes a single circumferential groove 46, the operation of which is described in greater detail below. The fiber optic connectors 30 are described in greater detail in U.S. Pat. No. 5,594,826 to Wood et al., which is hereby incorporated by reference.

Each of the fiber optic connectors 28, 30 may be secured in the desired position with respect to the supporting member 20, and consequently in the desired position with respect to the focal point of the light source assembly 14. The engagement portion 38 is placed into the threaded mounting aperture 24 of the supporting member 20, and is threaded completely therein. In the case of the fiber optic connectors 30, the supporting member 20 is provided with a pair of aligned holes 48, each being are adapted to receive respective spring loaded fasteners 50. The holes 48 preferably comprise a pair of threaded sections accessible from the exterior 54 of the supporting member 20, and extending into the mounting apertures 26. Fasteners 50 each preferably, but not necessarily, comprise a fastener of the type commonly referred to as a "ball detent", which includes threaded members containing an interior passage containing a spring-loaded ball element 52. This type of fastener is preferred both because its ball element is sized to engage the circumferential groove 46 of a fitted fiberoptic connector 30 and thereby exert an axial positioning force, and because the internal spring (not shown) allows the fastener to apply a light radial biasing force to the fiberoptic connector. In addition, the ball detent fastener 50 also allows a fiber optic connector 30 to be easily removed, reinserted or interchanged by merely pulling them out or pushing them into the supporting member 20 of the turret assembly 16 without detachment of the latter. The ball detents 50 are described in greater detail in the previously incorporated U.S. Pat. No. 5,594,826.

Still referring to FIG. 1, the exterior 54 of the supporting member 20 is sized to be inserted into an interior recess 58 of an adjusting ring or knob 56 having a central opening 60 to allow insertion of the fiber optic connectors 28, 30, as described below.

The turret assembly 16 also includes a light intensity control member 66, which is preferably a thin disc-shaped element having a plurality of circumferentially spaced teardrop-shaped apertures 70 disposed about a center opening 68. According to this embodiment, the center opening 68 has a diameter which is the same size as that of the center opening 33 of the supporting member 20 to allow the hub member 32 to extend therethrough during assembly to the light box 10, FIG. 2. The intensity control member 66 is fixedly attached to the back side of the adjusting ring 56 by a plurality of small equally spaced fasteners 70 attached through corresponding openings (not shown) in the adjusting ring. The teardrop apertures 74 are shaped and sized so as to completely occlude, block a fraction, or completely allow the source of illumination to project into a light path 80, FIG. 2, extending from the light source assembly 14, as described in greater detail below. The interior or periphery of the center opening 60 of the adjusting ring 56 includes a pair of oppositely disposed and inwardly directed tabs 84, the function of which is also described in greater detail below.

Referring in general to the FIGS., the turret assembly 16 is assembled to the light box 10 by means of a central fastener 90 which is threaded into aligned holes 92 and 94 in the hub member 32 and the front wall 18 of the light box, respectively. The hub member 32 extends through the central openings 60, 33, and 68 of the adjusting ring 56, supporting member 20, and light intensity control member 66, respectively.

The light intensity member 66 is controlled by the rotation of the adjusting ring 56 which is prevented from rotating in excess of approximately 45 degrees in either radial direction 98 due to the presence of restricting shelves (not shown) located on the interior periphery of the adjusting ring which engage an arcuate engagement section 96 provided in the supporting member 20. Such a feature maintains a teardrop aperture 90 in alignment with a mounting aperture 24, 26 so as to allow the aperture to block a portion of the light projecting from the light source assembly 14 along the light path 80, FIG. 2, as shown in FIG. 3.

As noted above, a certain amount of frictional drag is supplied by the inwardly directed tabs 84 located on the interior of the adjusting ring 56, which prevents the light intensity control member 66 from being too freely movable. According to this embodiment, a pair of tabs 84 are oppositely situated for contact with the front surface 88 of the supporting member 20 so as to prevent movement of the light intensity control member 66 until a predetermined amount of force overcomes the drag provided by the tabs 84.

Referring to FIGS. 1–3, the light box 10 includes an ON/OFF switch 62 which activates the light source assembly 14 and allows white light to be projected along the light path 80. In operation, the supporting member 20 is rotated by means of gripping any one of the threaded fiber optic connectors 28 and imparting a radial force in either direction 98 to allow rotation about the axis 22. The ball detent fasteners 50 located in the center opening 33 of the supporting member 20 provides indexing by the engagement of the ball portion 52 with any of a set of indents 100 provided on the exterior 102 of the hub member 34. Four (4) detents 100 are provided at 90 degree intervals according to the present embodiment to account for the four supported fiber optic connectors 28, 30. The hub member 32 preferably includes a guide member 104 engageable with the light box 10 to insure proper angular alignment for assembly thereto. Movement of the adjusting ring 56 also in the radial direction 98 moves one of the teardrop apertures 90 to adjust the amount of illumination entering a fiber optic bundle (not shown) retained in an aligned fiber optic connector 28, 30.

The fiber optic connectors 28, 30 can easily be interchanged with other connectors (not shown) of the same size by merely unscrewing the connectors from the threaded openings 24. In similar fashion, fiber optic connectors (not shown) can easily be interchangeably placed into the openings 26 where the connectors are maintained by the engagement of the ball detent fasteners 50 with the grooves 46 of the connectors 30. It will be readily apparent that proper sizing of the holes 24, 26 allows connectors of different sizes and types into the turret assembly 16.

PARTS LIST FOR FIGS. 1–3

| | |
|---|---|
| 10 | light box |
| 12 | housing |
| 14 | light source assembly |
| 16 | turret assembly |
| 18 | front wall |
| 20 | supporting member |
| 22 | axis of rotation |
| 24 | threaded opening |
| 26 | opening |
| 28 | fiber optic connector |
| 30 | fiber optic connector |
| 32 | hub member |
| 33 | center opening (supporting member) |
| 34 | cylindrical housing |
| 36 | hollow interior |
| 38 | threaded engagement portion |
| 40 | housing |
| 42 | hollow interior |
| 44 | engagement portion |
| 46 | circumferential groove |
| 48 | aligned holes |
| 50 | fasteners |
| 52 | ball element |
| 54 | exterior (supporting member) |
| 56 | adjusting ring |
| 58 | interior recess (adjusting ring) |
| 60 | center opening (adjusting ring) |
| 62 | ON/OFF switch |
| 66 | light intensity control member |
| 68 | center opening (light intensity control member) |
| 70 | tear-drop shaped apertures |
| 74 | fasteners |
| 80 | light path |

-continued

PARTS LIST FOR FIGS. 1–3

| | |
|---|---|
| 84 | tabs |
| 88 | front surface (supporting ring) |
| 90 | central fastener |
| 92 | hole |
| 94 | hole |
| 96 | arcuate engagement section |
| 98 | direction |
| 100 | indents |
| 102 | exterior (hub member) |
| 104 | guide member |

While this invention has been explained with reference to the structure disclosed herein, it is not confined to the details as set forth and this application is intended to cover any modifications and changes as may come within the scope of the following claims.

I claim:

1. A turret assembly for supporting and indexing a plurality of fiber optic bundles relative to a source of illumination, said turret assembly comprising:

support means for supporting a plurality of fiber optic bundles;

means for rotatably adjusting said support means for moving at least one of said fiber optic bundles into and out of a light path projecting from said source of illumination; and adjustable intensity control means for variably controlling the intensity of light from said source of illumination entering said at least one supported fiber optic bundle, wherein said support means includes a support member having a plurality of receiving ports for receiving said fiber optic bundles and said adjustable intensity control means includes a planar member having at least one aperture of variable size positioned between said support means and said source of illumination and a rotatable adjustment member fixedly attached to said planar member and in overlaying relation to said support member, said adjustment member causing said planar member to independently align said at least one variably sized aperture with said light path to affect the amount of illumination impinging upon said at least one supported fiber optic bundle.

2. A turret assembly as recited in claim 1, wherein said support member includes a plurality of circumferentially disposed apertures sized for accommodating said plurality of fiber optic bundles, said support member being mountably supported for rotation through a central opening extending therethrough.

3. A turret assembly as recited in claim 2, including indexing means for indexing each of said supported fiber optic bundles into a predetermined angular position relative to said light path.

4. A turret assembly as recited in claim 3, wherein said indexing means includes at least one spring loaded fastener extendable through the central opening of said support means, said fastener being engageable with a supporting hub member, wherein said hub member includes at least one indented portion on an outer surface thereof to indicate when a fiber optic bundle is aligned with said light path.

5. A turret assembly as recited in claim 4 wherein said hub member includes a plurality of equally spaced indented portions equal in number to the number of supporting apertures on said support member.

6. A turret assembly as recited in claim 1, wherein said adjustable intensity control means includes friction means for preventing said planar member from being rotated until a predetermined force has been applied thereto.

7. A turret assembly as recited in claim 6, wherein said adjustment member includes at least one tab member for contacting a facing surface of said support member when said adjustment member is rotated.

8. A turret assembly as recited in claim 2, wherein said fiber optic bundles are each retained in a fiber optic connector sized for fitting in a corresponding supporting aperture of said support member, said connectors each having an engagement portion for engaging said apertures in said support member.

9. A turret assembly as recited in claim 8, wherein at least one said fiber optic connector has an engagement portion which is threaded, wherein said support member includes a corresponding threaded supporting aperture sized for accommodating said threaded engagement portion.

10. A turret assembly as recited in claim 8, wherein at least one fiber optic connector includes an engagement portion having a circumferential groove, said support member having engaging means for engaging said groove for retaining said at least one connector in at least one opening thereof.

11. A turret assembly as recited in claim 10, wherein said support member includes a spring-loaded fastener extending into at least one said opening for engaging said circumferential groove so as to retain said connector.

12. A turret assembly as recited in claim 1, wherein said at least one aperture is substantially teardrop-shaped to effectively block all, none, and a fraction of the light path from said a supported fiber optic bundle depending on the radial position of said at least one aperture.

13. A turret assembly for supporting and indexing a plurality of fiber optic bundles relative to a light source, said turret assembly comprising:

a supporting element having a plurality of openings for retaining a plurality of fiber bundles;

a hub member for retaining said supporting element in a central opening and for allowing said supporting element to rotate thereabout so as to cause supported fiber bundles to be moved into and out of alignment with a light path from said light source;

a light intensity control member for adjusting the intensity of light entering said at least one fiber optic bundle from said light source, said light intensity member being positioned between said light source and said supporting element; and means for independently rotating said light intensity control member relative to said supporting element, said means including an adjustment member disposed over said supporting element and fixedly attached to said light intensity control member.

14. A turret assembly as recited in claim 13, wherein said light intensity control member includes at least one aperture having a variable diameter so as to vary the illumination output of light entering said at least one fiber optic bundle when said light intensity control member is rotated.

15. A turret assembly as recited in claim 14, wherein said light intensity control member includes a plurality of substantially teardrop shaped apertures spaced in a circumferential manner thereabout.

16. A turret assembly as recited in claim 13, wherein each of said fiber optic bundles are fitted into a fiber optic connector, said connector including a housing sized to fit in a corresponding opening of said supporting element.

17. A turret assembly as recited in claim 16, wherein said supporting element includes a circular body portion having a plurality of circumferentially arranged openings sized to accommodate different fiber optic connectors.

18. A turret assembly as recited in claim 15, wherein said adjustment member is rotatably attached to said light intensity control member, said adjustment member having means for moving a teardrop-shaped aperture into and out of alignment with said light path.

19. The turret assembly of claim 17, wherein said fiber optic bundles are retained within connectors and in which said body portion includes at least one receiving hole for receiving a said fiber optic connector, said at least one receiving hole having a ball detent fastener positioned through an opening in said supporting body for abutting said receiving hole in order to grip a fiber bundle connector positioned therein.

20. A turret assembly as recited in claim 18, including at least one detent member for retaining said supporting member in a predetermined angular position relative to said light path.

21. A light box having a housing and a source of illumination retained within said housing, said light box including an exterior turret assembly comprising supporting means for rotatably supporting a plurality of fiber optic bundles, means for adjusting the rotatable position of said supporting means for selectively moving at least one of said fiber optic bundles into alignment with a light path from said source of illumination, a light intensity control member positioned between said source of illumination and said supporting means for varying the intensity output of light entering said at least one fiber optic bundle, and means for independently adjusting said light intensity member relative to said supporting member, said independent adjusting means including an adjustment member disposed over said supporting means and fixedly attached to said light intensity control member.

22. A turret assembly for positioning and indexing a plurality of fiber optic light bundles in proximity to a light source located within a light box, said turret assembly comprising:

a supporting body having a central opening and a plurality of circumferentially disposed receiving holes sized for receiving fiber bundles;

a hub mounted through said central opening so as to allow said supporting member to be rotatable thereabout and adapted to be fixedly mounted on the light box;

light intensity control means to control the amount of light allowed to pass from said light source to at least one said fiber optic bundle supported on said supporting body; and means for independently adjusting said light control intensity means relative to said supporting body, said independent adjusting means including an adjustment member disposed over said supporting body, said adjustment member being fixedly attached to said light intensity control means.

23. The turret assembly as recited in claim 22, including a pair of ball detects, radially positioned at least 90° apart and extending through said supporting means to said central opening;

said hub having a plurality of small spaced indentations to receive said ball detects for indexing said fiber optic connectors to a predetermined angular position relative to said light source.

24. The turret assembly of claim 22, wherein said light intensity control means includes a planar member having a central opening sized for receiving said hub and positioned between said light source and said supporting body in said assembly, said member having teardrop-like shaped apertures corresponding to each of said plurality of receiving holes in said supporting body; and an adjustment knob fixedly attached to said planar member and supported for rotation about a common axis.

* * * * *